(No Model.)
A. SHEDLOCK.
SCREW THREAD GAGE.
No. 320,976. Patented June 30, 1885.
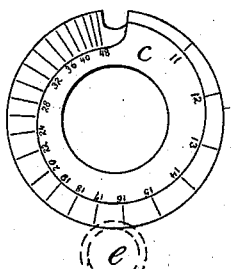 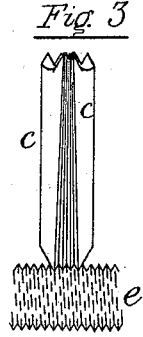
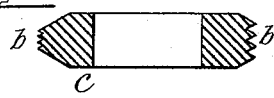
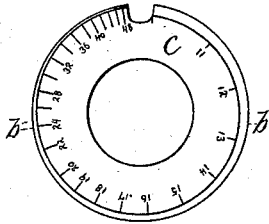
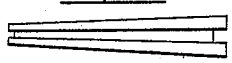
Witnesses
Alfred Shedlock.
Inventor

UNITED STATES PATENT OFFICE.

ALFRED SHEDLOCK, OF BROOKLYN, NEW YORK.

SCREW-THREAD GAGE.

SPECIFICATION forming part of Letters Patent No. 320,976, dated June 30, 1885.

Application filed August 20, 1884. (No model.)

*To all whom it may concern:*

Be it known that I, ALFRED SHEDLOCK, a citizen of the United States, residing at Brooklyn, county of Kings, State of New York, have invented certain new and useful Improvements in Screw-Thread Gages, of which the following is a specification.

This invention embraces the practical application to the measurement of pitches of screw-threads of a series of lines gradually and uniformly approaching or converging toward a common center, and having marked at their side numbers indicating fractional parts of an inch or other unit of measure, corresponding to the distances between the parts of the lines so marked.

In the accompanying drawings, Figure 1 is perspective view of a flat gage having a series of converging grooves. Fig. 2 is a front view of a disk having the grooves formed on its periphery. Fig. 3 is a side view, and Fig. 4 a transverse section, of the same. Figs. 5 and 6 are front and side views of another way of arranging the grooves, and Fig. 7 is a side view of a gage for gaging square threads.

$a$ in Fig. 1 is a taper piece of metal with V-shaped grooves $b$ converging toward a common center formed on the top of it, the angle of the grooves remaining constant throughout their length.

It will be observed that when a screw or analogous article whose thread-pitch is within the limits of the gage is applied to the grooves, a part of the grooves will be found to exactly fit the threads, and at this part of the gage on its side will be found a number corresponding to the thread-pitch or number of threads or divisions to the inch or other unit of measure employed. The gage is marked with a series of indicating-numbers along its side, as shown, so that the pitch of screw-threads within the limits of the gage may be obtained.

In practice, for convenience of use, I prefer to form said converging grooves $b$ on the periphery of a disk, $c$, as shown in Figs. 2, 3, and 4, and mark the indicating-numbers on the flat side of the disk, with lines extending therefrom to the edge, as shown in Fig. 2. In this circular form it is easier to see when the grooves of the gage and the threads of a screw match. The dotted lines $e$ represent a screw which in determining its pitch is moved around the periphery of the gage until the grooves and thread fit. In this case the fit takes place half-way between the numbers 16 and 17, indicating the thread to be equal to sixteen and one-half to the inch, thus showing that threads of fractional parts of as well as whole numbers of division may be readily indicated.

The modification in Figs. 5 and 6 shows one of the outer half-grooves of the gage parallel with one side of the disk, instead of the grooves being centrally located on the periphery, as in the figures before described.

Any shaped threads may be measured by means of gages constructed on this plan, either in the flat or circular form, by forming correspondingly-shaped grooves on the gage. A side view of a gage adapted to measure square threads is shown at Fig. 7. Such a gage will also be of great utility in supplying a ready means for giving the sizes of screw-cutting tools to properly cut any desired square thread by fitting the tool in the part of a groove opposite the number which indicates the desired pitch.

In measuring two or three threaded screws, &c., the pitch of the same is readily arrived at by dividing the number of the gage opposite the part of grooves in which the screw fits by two or three, &c., as the case may be. The size of the grooves and the number of threads any given gage is made to indicate are discretionary.

What I claim, and desire to secure by Letters Patent, is—

1. A screw-thread gage consisting of a piece of metal provided on its edge with grooves converging toward each other and having graduations on its side, substantially as and for the purpose set forth.

2. In a screw-thread gage, a disk having on its periphery a series of grooves gradually and uniformly approaching together and numbers marked on its side which indicate the divisions of a measure-unit the adjacent parts of the grooves correspond to, substantially as set forth.

In witness whereof I have hereunto set my hand, at New York, county and State of New York, this 4th day of March, 1884.

ALFRED SHEDLOCK.

Witnesses:
FLOYD CLARKSON,
H. D. WILLIAMS.